No. 724,100. PATENTED MAR. 31, 1903.
M. HENIUS.
WORT SEPARATOR.
APPLICATION FILED JUNE 30, 1902.
NO MODEL. 3 SHEETS—SHEET 2.
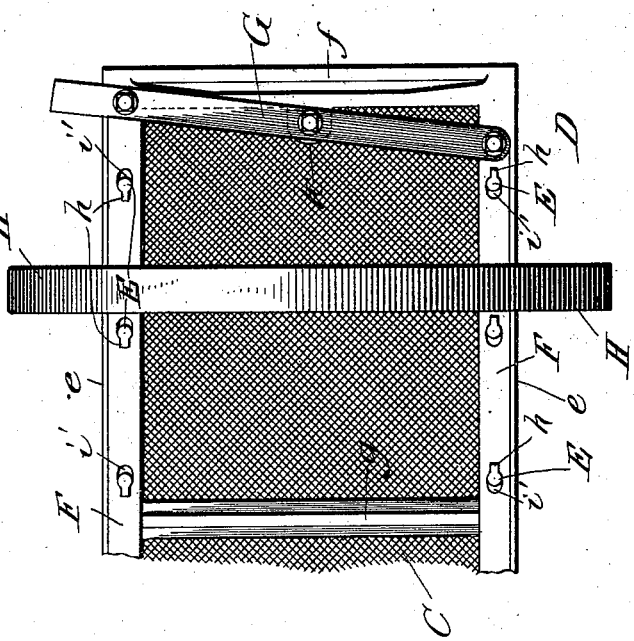
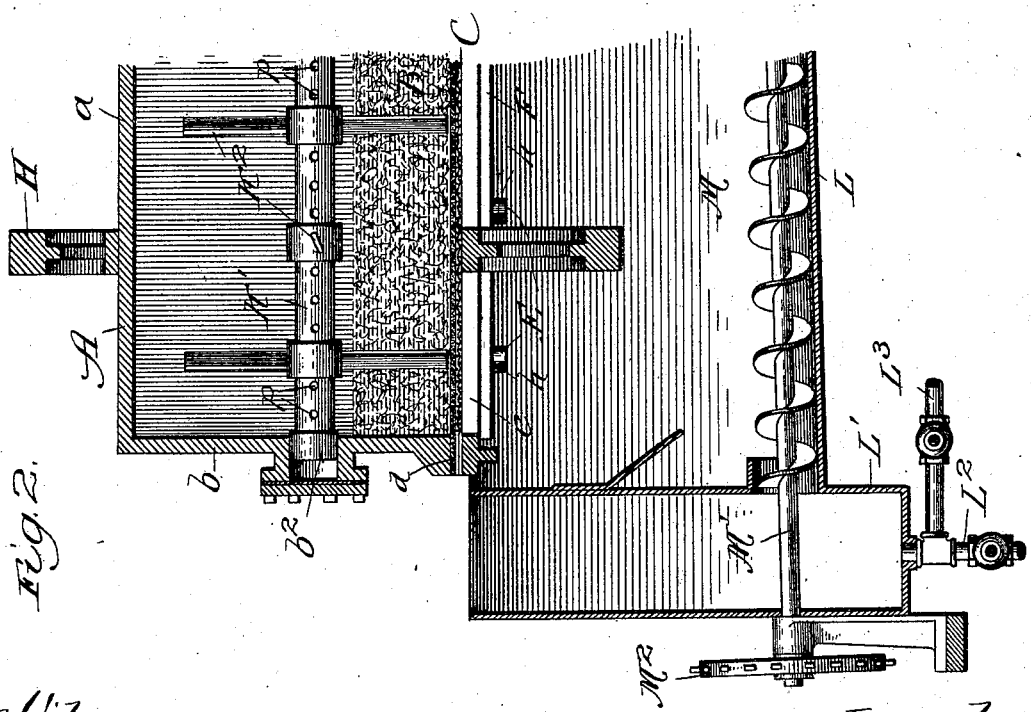

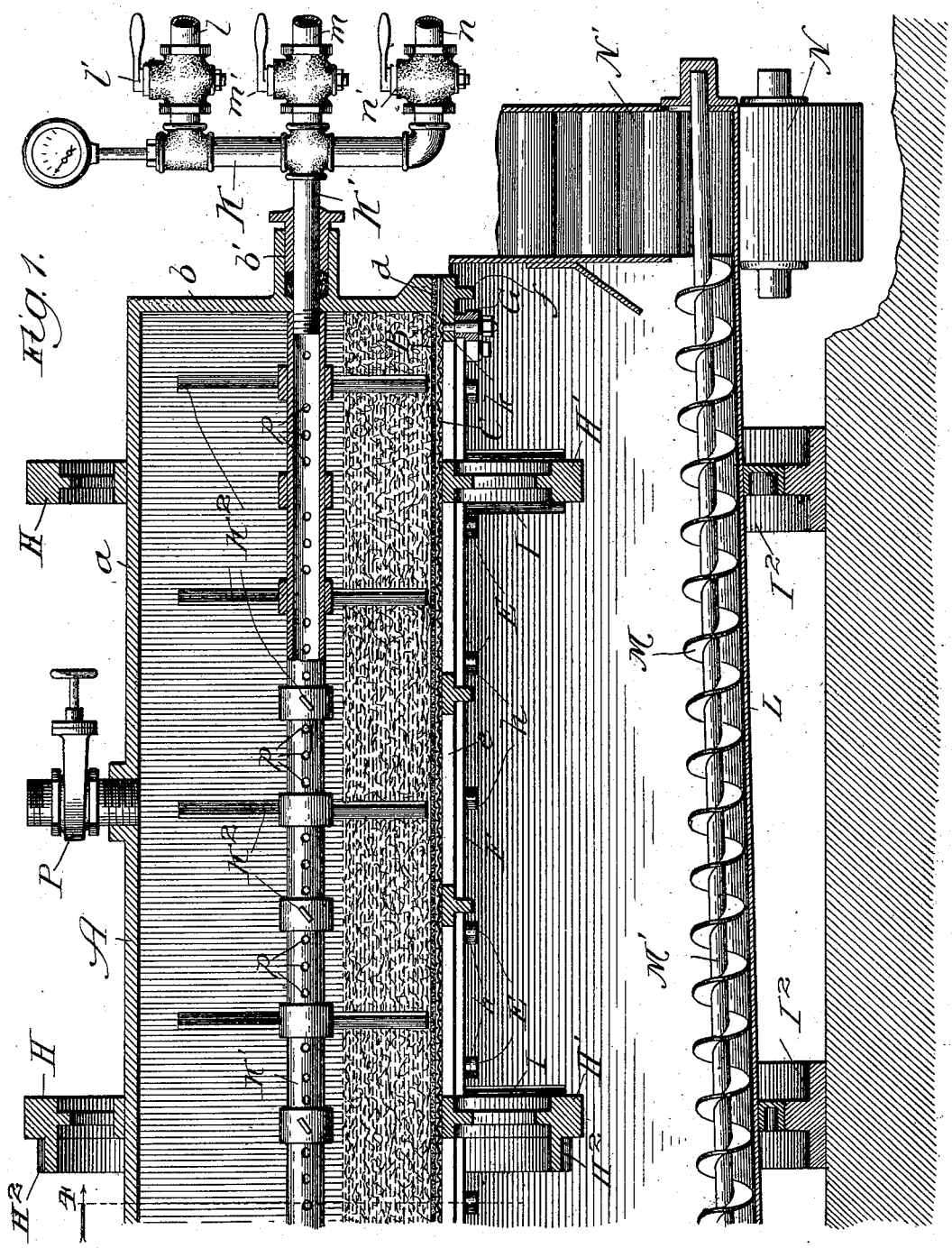

No. 724,100. PATENTED MAR. 31, 1903.
M. HENIUS.
WORT SEPARATOR.
APPLICATION FILED JUNE 30, 1902.
NO MODEL. 3 SHEETS—SHEET 3.
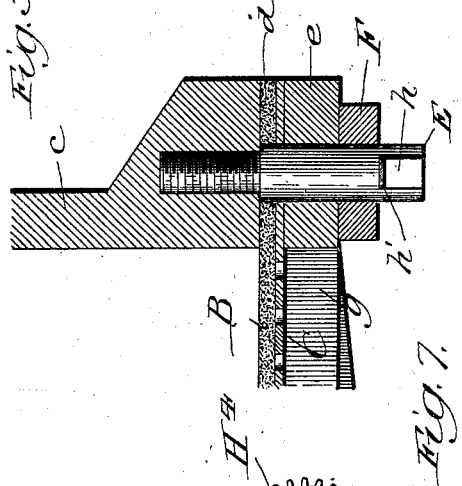
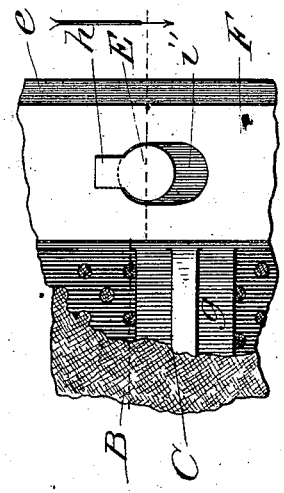
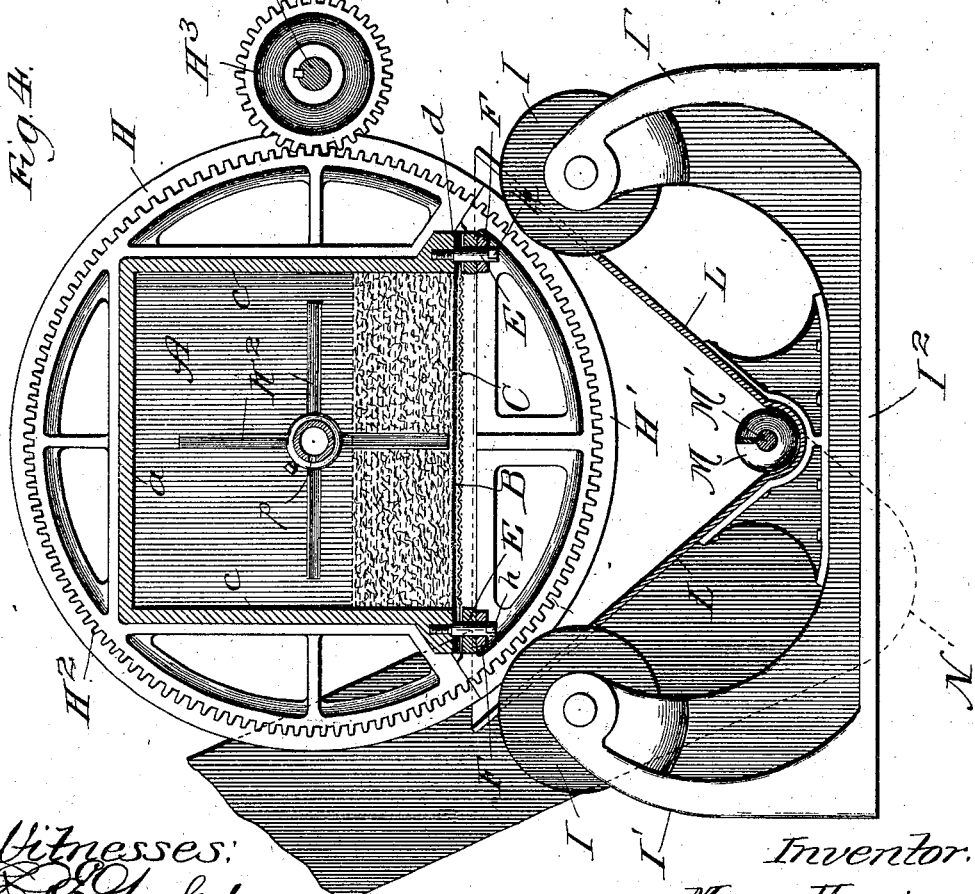
Witnesses:
Inventor:
Max Henius,
By Dyrenforth, Dyrenforth & Lee,
Attys.

UNITED STATES PATENT OFFICE.

MAX HENIUS, OF CHICAGO, ILLINOIS.

WORT-SEPARATOR.

SPECIFICATION forming part of Letters Patent No. 724,100, dated March 31, 1903.

Application filed June 30, 1902. Serial No. 113,786. (No model.)

*To all whom it may concern:*

Be it known that I, MAX HENIUS, a citizen of the United States, residing at Chicago, in the county of Cook and State of Illinois, have invented new and useful Improvements in Wort-Separators, of which the following is a specification.

My invention relates to improvements in apparatus for use more especially in the separation or extraction of wort as a step in the process of brewing malt beverages.

My present improved apparatus is particularly adapted for employment in practicing the art of brewing according to a process described in detail in an application for Letters Patent of the United States filed by me May 15, 1902, and bearing Serial No. 107,420, one of the steps of this process involving filtering the entire material of the mash extraneously of the mashing vessel for further treatment in the manufacture of beer, and while my present improvements are particularly adapted, as before stated, for performing the filtering operation in the practice of said process it may be employed to great advantage in separating wort in any other process which involves filtration extraneously of the mashing vessel.

In the preparation of finished wort by filtration through filtering-beds in the mash-tuns or through filter-presses, as hitherto provided, there is necessarily great waste, by reason of the difficulties in the way of obtaining all the extract which the material is capable of yielding.

My object is, in the connection last referred to, to provide a wort-separator of novel as well as comparatively simple and inexpensive construction, whereby the filtration of wort, both from grains and hops, may be effected more thoroughly and with greater economy both of time and labor than by any other filtering means hitherto employed and of which I am aware.

In the drawings, Figure 1 is a broken longitudinal section of a part of my improved apparatus, Fig. 2 being an extension of Fig. 1, the two views together showing the apparatus throughout its length; Fig. 3, a broken plan view of the cover or filtering side of the apparatus; Fig. 4, a broken section taken on line 4 in Fig. 1; Fig. 5, an enlarged broken section illustrating means for fastening the filtering-cover in place; Fig. 6, a bottom plan view of the part shown in Fig. 5, and Fig. 7 a broken view of a detail of the cover-fastening means.

A is a filtering tank or casing formed with a base-wall $a$, end walls $b\ b$, and side walls $c\ c$ integral with each other. The tank A is preferably rectangular in cross-section, as shown. The size of the tank will depend upon the requirements in the particular brewery where it is employed, and I contemplate constructing it in length up to or even exceeding thirty feet and of a width and depth up to or even exceeding eight feet, to receive, if desired, all the material of a single brew in a large establishment. The tank may be of wrought-iron, steel, or any other desirable material. The free edges of the sides and ends $c\ b$ are enlarged to form flat seating-faces $d$ to receive a layer of filtering-cloth B, against which rests a perforated plate or screen C, the said cloth and plate being the full width and full length of the tank.

D is a covering-frame consisting of side bars $e\ e$, with integral end bars $f$ and intermediate integral cross-extending ribs $g$. At intervals along the edge-seating face $d$ of the sides $e$ are pins E, provided at one side with integral lugs $h$ and formed on their under surfaces with cam-shoulders $h'$.

The filtering-cloth B and screen C are provided along their opposite edges with openings to register with and pass over the pins E. In the side bars $e$ of the frame D are elongated openings $i$, capable of passing over the pins E. On one side $c$ the lugs $h$ of the pins E extend in one direction, while on the other side $c$ said lugs extend in the opposite direction, as clearly shown in Fig. 3.

Resting and sliding longitudinally against the side bars $e$ of the frame D are locking-bars F of approximately the same length as the side bars $e$ and having elongated openings $i'$, adapted to register with the openings $i$ of the said side bars. At opposite ends of the bars F are pivotally connected levers G, which are fulcrumed between their ends upon ears $k$ on the end bars $f$. When the frame D is placed in position against the screen C, its openings $i'$ and the openings $i$ of the bars F pass over the pins E. By turning the lever G upon the fulcrums at $k$ the bars F are forced, respectively, in opposite directions, whereby the edges of the openings $i'$ pass under the cam-shoulders $h'$ of the pins and lock the frame against the tank. In this locking operation the frame is pressed tightly against the screen to clamp and fasten the latter and the filtering-cloth securely around their edges.

H H are ring-segments fitting around three sides of the tank in the positions shown. On the frame D are ring-segments H', which when the frame is in place register with and form continuations of the ring-segments H to complete the circles. The rings H H' rest, as shown in Fig. 4, on antifriction-wheels I I, mounted in standards I' on bed-frames $I^2$. Integral with one of the wheels or annular tracks H H' is a gear-wheel $H^2$, formed of segmental sections corresponding with those of the annular tracks to permit removal of the frame D when desired. Meshing with the gear-wheel $H^2$ is a pinion $H^3$, which is mounted upon a shaft $H^4$, driven to rotate from any suitable source of power.

K is a stationary pipe to which lead a pipe $l$ from a steam-supplier, a pipe $m$ from a water-supplier, and a pipe $n$ from a compressed-air supplier. In the pipes $l$ $m$ $n$ are the cocks $l'$ $m'$ $n'$. Extending from the pipe K is a pipe K', passing through a stuffing-box $b'$ in the adjacent end $b$ and extending longitudinally through the tank to a bearing $b^2$ in the opposite end $b$. The pipe K is stationary and provided at intervals along its length within the tank with radially-extending stirrer arms or blades $K^2$. In the pipe K' within the tank are longitudinal series of perforations $p$.

Beneath the tank A and mounted in the bed-frames $I^2$ is a trough L, inclined from one end to the other. At its lower end, beyond one end of the tank, the trough L is provided with a sump L'. This sump communicates with the valved pipe $L^2$, which may lead to a sewer or drain, and a valved pipe $L^3$, communicating with a pump (not shown) which, as hereinafter explained, is employed to elevate the wort to vessels in the brewery for further treatment. Extending along the base of the inclined trough L the full length thereof is a screw conveyer M on a shaft M' driven from a sprocket-wheel $M^2$. The conveyer M terminates at an elevator-boot N, from which rises a bucket-elevator N', leading to a desired place or receptacle. At the center of the base $a$ of the tank is a short valved supply-pipe P.

In practice my improved apparatus when employed as a wort-separator would be located, preferably, in the lower story of the brew-house and when turned to the filtering position shown in the figures the supply-pipe section P would register with or be in position to be coupled to a supply-pipe. (Not shown.) This supply-pipe would connect with the vessels in which the mash is made as well as the vessels where the wort is hopped and made ready for the filtering operations.

In the use of the wort-separator, particularly in carrying out the process of brewing according to my invention above referred to, the supply-pipe connected with the pipe P is caused by the opening of a suitable valve to drain the vessel in which the suitably-prepared mash is stored, whereby the entire charge flows into the tank A and spreads itself evenly and to a uniform depth throughout upon the bed formed by the filtering-cloth B. A large proportion of the wort will pass through the filtering-cloth while the mash is entering the tank, and falling into the trough L flows to the sump L'. The valve of the pipe $L^2$ is closed and the valve of the pipe $L^3$ opened and the pump before mentioned operated to pump the wort as it accumulates to the vessel in which the next step in the brewing operation is to be performed. As soon as the entire charge has entered the tank A the valve $n'$ is opened to fill the tank with air-pressure, which obviously bears with an even pressure upon the entire upper surface of the mass of grain and forces nearly all the remaining wort through the filtering-cloth. After this first operation quite a large percentage of valuable extract will still remain in the mass of grain. When the first operation is completed, as described, the air-supply valve $n'$ is closed and the water-supply valve $m'$ is opened, causing a stream of water to play through the perforations $p$. As it is desirable to maintain the mass at a more or less high temperature, steam may also be turned in by opening the cock $l'$ during the sparging operation described. While the sparging is taking place the shaft $H^4$ is caused to rotate and through the gears $H^2$ $H^3$ to rotate the tank upon its bearings I. The pipe K', and consequently the stirrer-arms $K^2$, remain stationary while the tank is rotated, so that the stirrer-arms assist in breaking up the mass of grain to produce a uniform solution. When the sparging and stirring operations are completed, the tank is brought to the position shown, with its filtering side down, and after closing the valves $l'$ $m'$ the valve $n'$ is again opened to fill the tank with air-pressure and force out the remaining extract. The sparging, stirring, and squeezing operations may be repeated until substantially all the wort has been extracted. When this operation is completed, the tank is turned to the upright position wherein the filtering side is at the top. The lever G is then turned to free the locking-bars F from the pins E, and the frame D, screen C, and filtering-cloth B are removed. The tank is then upset on its bearings, causing the spent material to fall into the trough L. The conveyer M is then operated to move the spent material along to the elevator-boot N, and the elevator N' is operated to carry the material off. When the tank has been emptied and the trough L cleared by means of the conveyer and elevator, the water-inlet valve $m'$ may be opened and also the steam-inlet valve $l'$, if desired, to direct streams of water from the pipe-opening $p$ against the inner walls of the tank and conveyer-arms to clean the same as thoroughly as possible of all particles of grain, &c., which adhere to the surfaces. While this washing-out operation is taking place, the valve of the pipe $L^2$ may be opened to drain off the wash-water. After cleaning the screen and filtering-cloth and replacing them with the frame D the apparatus is ready for another operation. The apparatus may then be employed to filter the hops intermediate of the operations of filtering the mash of the successive brews, thus avoiding the necessity of separate filtering apparatus.

My improved apparatus when employed in the particular connection referred to is intended to take the place in the step of wort separation of filtering-beds in the mash-tuns, which, being formed by the hulls of the malt, are necessarily imperfect filters and wasteful, owing to the necessary coarseness of the grain, which precludes thorough extraction from the grains.

It is impossible to perform the wort separation in filtering-presses as ordinarily hitherto constructed in a manner to prevent material waste of the extract. One reason for this is that the grain becomes unevenly compacted in the filtering-chambers, so that when subjected to air-pressure the air makes and forces its way through channels in the grain. In my improved apparatus the material spreads itself uniformly over the base or filtering side of the tank, and air-pressure is uniform over the entire surface, thus insuring substantially complete extraction of liquid. I prefer to form the tank rectangular in cross-section, as shown, and more especially with a flat filtering side in order to insure uniform depth of the material, and consequently uniform filtration throughout the mass. As the apparatus may be used in separating the wort from the hops as well as the grains, it may be kept in operation more or less continuously, and for this reason my improved means for holding the filtering-cloth securely in place, involving the frame D and attendant parts, is important, because they enable the removing and replacing of the filtering-cloth to be quickly performed.

While I prefer to construct my improved apparatus throughout as shown and described it may obviously be varied in the matter of details of construction without departing from the spirit of my invention as defined by the claims; and while I have described the apparatus as particularly adapted for use as a wort-separator it is not to be limited to such use. As a matter of fact the apparatus may be employed in the place of the apparatus heretofore provided for effecting the mashing operation in the process of brewing, because it affords every facility for mixing, sparging, and filtering the grain.

Although the tank is described as rectangular in cross-section the invention is not to be limited to this form, nor is it necessary that it shall be turned at all or that it shall be turned only in one direction, because the same stirring effect may be produced by rocking the tank back and forth on its bearings.

What I claim as new, and desire to secure by Letters Patent, is—

1. An apparatus for use in brewing, comprising a horizontally-disposed rotatable tank having an opening in one side between its ends the other sides being imperforate whereby when said opening is uppermost the contents are retained in the tank, a series of rotatable stirrers in the tank, a pervious filtering-cover for said opening with means for securing it removably in place, a supply-opening for the material to be treated, and means connected with the tank for supplying it with a fluid.

2. An apparatus for use in brewing, comprising a horizontally-disposed tank mounted upon bearings to rotate and having an open side, a pervious filtering-cover for said side with means for securing it removably in place, a supply-opening for the material, to be treated, in the tank, a pipe extending longitudinally in the tank, stirrers upon the said pipe, said stirrers and tank being relatively rotatable, and means for conducting fluid to said pipe.

3. A revoluble tank mounted upon bearings and having an open side with a pervious filtering-cover for said side with means for securing it removably in place, a valved supply-opening, for the material to be filtered, in the tank, a relatively stationary perforated pipe extending longitudinally in the tank, stirrers upon the said pipe, and means for conducting fluid to said pipe, substantially as and for the purpose set forth.

4. A revoluble tank mounted upon bearings and having an open side, a pervious filtering-cover for said side with means for securing it removably in place, a valved supply-opening, for the material to be filtered, in the tank, a perforated pipe extending longitudinally in the tank, and a water-supply conduit connected with said pipe, substantially as and for the purpose set forth.

5. A revoluble tank mounted upon bearings and having an open side, a pervious filtering-cover for said side with means for securing it removably in place, a valved supply-opening, for the material to be filtered, in the tank, and steam-supply, water-supply and compressed-air-supply conduits communicating with the tank, substantially as and for the purpose set forth.

6. A revoluble tank mounted upon bearings and having an open side bounded by a flat seating-face, a filtering-cloth and screen fitting over the said opening, a frame extending along the edges of the said cloth and screen, means upon the tank and frame for clamping the frame in place to hold the screen and filtering-cloth to the tank, a valved supply-opening in the tank for the material to be filtered, and means connected with the tank for filling it with fluid under pressure.

7. A revoluble tank mounted upon bearings and having an open side bounded by an edge presenting a flat seating-face, pins upon the said edge provided with cam-shaped shoulders, a filtering-cloth and screen extending across the said opening and having perforations to receive said pins, a frame having elongated perforations to receive said pins, and sliding bars upon the frame having perforations which register with the perforations of the frame, the bars being movable to engage the cam-shoulders of the pins and clamp the frame, filtering-cloth and screen in place, substantially as and for the purpose set forth.

8. The combination of a revoluble tank mounted upon bearings and having an open side, a pervious filtering-cover for said side with means for securing it removably in place, a valved supply-opening, for the material to be filtered, in the tank, means connected with the tank for filling it with fluid under pressure, an inclined trough beneath the tank, and a pipe connected with the trough through which filtrate may be withdrawn, substantially as and for the purpose set forth.

9. The combination of a revoluble tank mounted upon bearings and having an open side, a pervious filtering-cover for said side with means for securing it removably in place, a valved supply-opening, for the material to be filtered, in the tank, means connected with the tank for filling it with fluid under pressure, an inclined trough beneath the tank, a pipe connected with the trough through which filtrate may be withdrawn, and a drain-pipe extending from the said trough, substantially as and for the purpose set forth.

10. The combination of a revoluble tank mounted upon bearings and having an open side, a pervious filtering-cover for said side with means for securing it removably in place, a valved supply-opening, for the material to be filtered, in the tank, means connected with the tank for filling it with fluid under pressure, an inclined trough beneath the tank, a pipe connected with the trough through which filtrate may be withdrawn, and a conveyer extending longitudinally in the said trough for discharging the spent material, substantially as and for the purpose set forth.

11. The combination of a revoluble tank mounted upon bearings and having an open side, a pervious filtering-cover for said side with means for securing it removably in place, a valved supply-opening, for the material to be filtered, in the tank, means connected with the tank for filling it with fluid under pressure, an inclined trough beneath the tank, a pipe connected with the trough through which filtrate may be withdrawn, a conveyer extending longitudinally in the said trough, and an elevator at the end of said conveyer, substantially as and for the purpose set forth.

MAX HENIUS.

In presence of—
 WM. B. DAVIES,
 ALBERT D. BACCI.